May 17, 1960 J. B. ATWOOD ET AL 2,937,272

PULSE AMPLITUDE SELECTIVE CIRCUIT

Filed March 28, 1945

INVENTORS
JOHN B. ATWOOD
& GRANT E. HANSELL
BY H. S. Grover
ATTORNEY

United States Patent Office 2,937,272 Patented May 17, 1960

2,937,272

PULSE AMPLITUDE SELECTIVE CIRCUIT

John B. Atwood and Grant E. Hansell, Riverhead, N.Y., assignors to the United States of America as represented by the Secretary of the Navy Application March 28, 1945, Serial No. 585,359

8 Claims. (Cl. 250—27)

This invention relates generally to a method of and apparatus for distinguishing between pulses of different amplitudes.

The invention, though not limited thereto, finds application in a pulse communication receiver wherein it is desired to discriminate between desired incoming signal pulses having a certain range of amplitudes and interfering pulses of a different range of amplitudes. These interfering pulses may be signals from undesired sources. The invention is also useful in laboratory apparatus where pulse separation on an amplitude basis is desired.

An object of the present invention is to provide simple and efficient apparatus for eliminating interfering pulses which are of higher or lower amplitude than the desired pulses.

A further object is to provide improved apparatus capable of separating pulses of different amplitudes.

Figure 1:
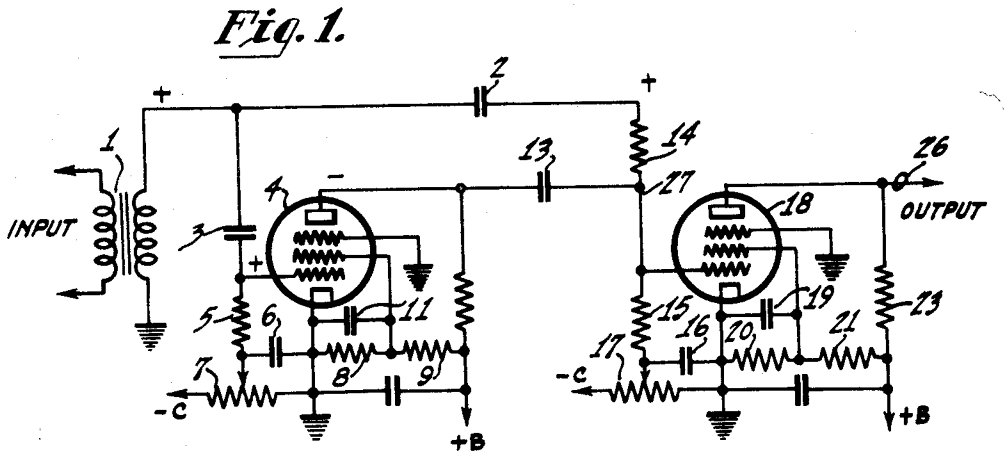
Figure 2:
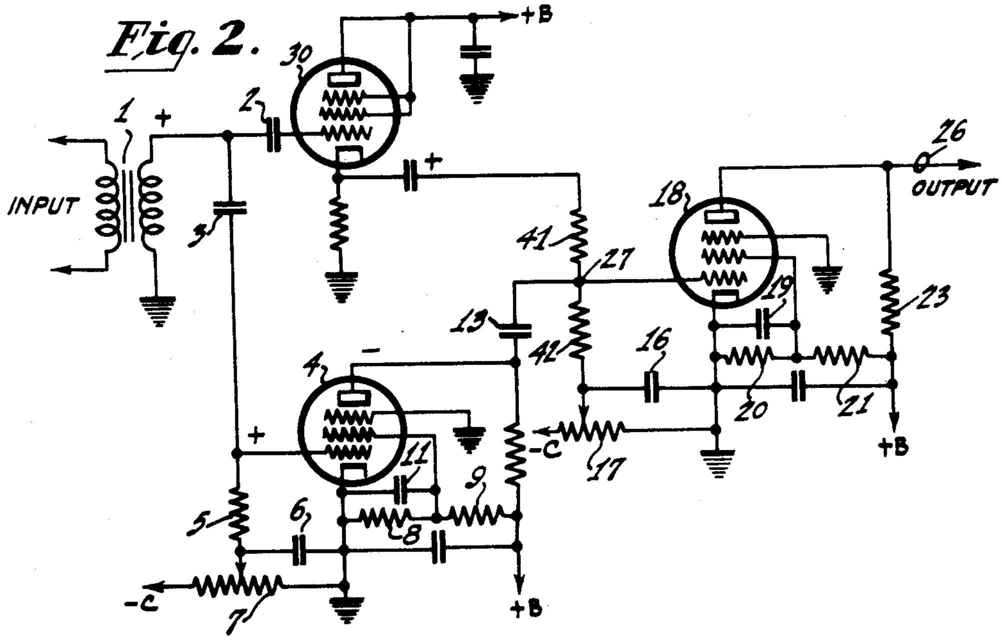

A description of the invention follows in conjunction with a drawing, wherein Figs. 1 and 2 illustrate two embodiments of the present invention. In these two figures, the same or equivalent parts are identified by the same reference numerals.

Referring to Fig. 1 in more detail, there is shown a pulse amplitude selective circuit comprising an input transformer 1, a pair of differentially biased pentode vacuum tubes 4 and 18, blocking condensers 2 and 3 for enabling the input pulses to be applied to the control grids of tubes 18 and 4, respectively, a voltage divider 14, 15, and an output terminal 26 at which only signal pulses of desired amplitude range appear.

The primary or left hand winding of the input transformer 1 is coupled to any suitable source of pulses, such as a receiver, while the secondary winding is arranged to supply positive pulses to the control grid of tube 18 via coupling condenser 2 and resistor 14, and also to supply positive pulses to the control grid of pentode tube 4 via coupling condenser 3. Tubes 4 and 18 are normally biased to the anode current cut-off condition, or somewhat beyond cut-off. In order to achieve this result, negative bias is supplied to the control grid of tube 18 from the potentiometer 17 through resistor 15, and negative bias is also supplied to the control grid of tube 4 from the potentiometer 7 through resistor 5. Tube 4 is supplied with a greater negative bias on its control grid than tube 18, for which reason there is a differential bias between the two tubes. Condensers 6 and 16 maintain the grid bias supply constant for tubes 4 and 18, respectively. Resistors 8 and 9, and condenser 11 provide a circuit for the screen grid of tube 4 which permits a sharp cut-off characteristic for tube 4 for small changes in amplitude of the pulses applied to this tube. Similarly, resistors 20 and 21, and condenser 19, provide a circuit for the screen grid of tube 18 which permits sharp cut-off characteristics for the tube 18 for small changes in amplitude of the pulses applied to the control grid of tube 18. From the foregoing, it will be seen that tube 18, which is normally non-conductive, will pass current when a certain magnitude of incoming pulse is applied to its control grid of a value sufficient to overcome the negative bias on its grid. Tube 4, however, which is also normally non-conductive, will pass current when its control grid is supplied with a pulse of a magnitude higher than that necessary to render tube 18 conductive, but sufficiently high to overcome the negative bias on the grid of tube 4. The pulses appearing in the output of tube 4 (that is, on its anode) have a polarity of opposite sign (negative) with respect to the positive pulses applied to its control grid through condenser 3. By suitable adjustments of the gains of tubes 4 and 18, and a suitable selection for the values of the resistors 14 and 15 comprising the voltage divider, and the biases applied to the control grids of the two tubes, the negative polarity pulse appearing on the anode of tube 4 is made to cancel or buck out the positive polarity pulse passed by coupling condenser 2 and appearing at point 27.

The operation of the system of Fig. 1 will now be given. Let us assume that it is desired to pass signal pulses of a desired amplitude range and to eliminate pulses of lower and higher amplitudes. Tube 18 is so biased that the pulses of amplitude lower than the desired signal pulses cannot pass through this tube. In view of the fact that tube 4 is biased somewhat more negative than tube 18, it will be clear that these pulses of lower amplitude will not pass through tube 4 either. Pulses of desired amplitude range and of positive polarity will pass through coupling condenser 2 and resistor 14 and will overcome the negative bias on tube 18, thus permitting tube 18 to pass pulses which appear on output terminal 26. However, these pulses which are within the desired range of values are still insufficient in magnitude to overcome the bias on grid 4. Tube 4 will, therefore, remain non-conductive for pulses of the desired amplitude range. Interfering pulses of higher magnitude than the desired amplitude range will cause tube 4 to pass current and produce negative pulses on the anode of tube 4. These negative pulses on the anode of tube 4 will pass through coupling condenser 13 and appear at junction point 27. At the same time, positive pulses passing through coupling condenser 2 and resistor 14 will also appear at junction point 27. These positive and negative pulses on junction point 27 will be of substantially the same magnitude and thus cancel or buck each other out. From the foregoing, it will be seen that low level input pulses are biased off by tube 18, while intermediate level pulses are passed by tube 18 and high level pulses of a magnitude sufficient to pass through tube 4 are cancelled or bucked out.

Fig. 2 illustrates a preferred and improved arrangement. The arrangement of this figure is substantially the same as that of Fig. 1, except that it includes a cathode follower tube 30. The circuit elements of the cathode follower 30 are so adjusted that the pulses obtained from the cathode of tube 30 are of substantially the same or less magnitude than those applied to the grid of tube 30 via coupling condenser 2. The values of the resistors in the voltage divider 41, 42 are so related to the values of the other circuit elements that the pulses passed on to the control grid of tube 18 via the cathode follower appear thereon at the same time as the pulses which pass through tube 4. Resistors 41 and 42 of the voltage divider of Fig. 2 can have smaller values than the correspondingly located resistors 14 and 15 of Fig. 1, thus giving certain advantages over the system of Fig. 1, insofar as adjustments of the time constants of the selective circuit are concerned.

The operation of the system of Fig. 2 is substantially the same as that of Fig. 1. Positive pulses appearing on the secondary winding of input transformer 1 pass through coupling condensers 2 and 3 to the first grids of cathode follower 30 and tube 4. Positive pulses appear on the cathode of tube 30 and pass through resistor 41 to the control grid of tube 18. Tube 4 serves to invert the polarity of the pulses and thus produces negative pulses on its anode in response to positive pulses supplied to its control grid. As in Fig. 1, tubes 4 and 18 are differentially biased with the greater negative bias supplied to tube 4. Low level input pulses (that is, pulses of an ampltiude below the desired amplitude range) cannot pass through normally non-conductive tube 18. Intermediate level pulses of the desired frequency range overcome the bias on tube 18 and pass through this tube to the output terminal 26. However, these intermediate level pulses are insufficient in magnitude to overcome the cut-off bias on tube 4. High level pulses of a magnitude greater than the desired amplitude range overcome the bias on tube 4, but these pulses are cancelled or bucked out at the junction point 27 of the two resistors 41 and 42 by virtue of the fact that positive pulses from the cathode follower of the same magnitude also appear at this same junction point.

What is claimed is:

1. A pulse amplitude selective circuit comprising a source of pulses of positive polarity, a first screen grid tube, a connection including the series circuit of a coupling condenser and a voltage divider from said source to the input electrode of said tube, an output circuit coupled to the output electrode of said first tube, a second screen grid tube, a connection including another coupling condenser from said source to the control grid of said second tube, a connection including a third coupling condenser between the output electrode of said second tube and the input electrode of said first tube, said output electrode of said second tube and the input electrode of said first tube being connected to the same point on said voltage divider intermediate the ends of said divider, and means for normally biasing the input electrodes of both of said tubes to the anode current cut-off condition but with a greater bias on said second tube.

2. A pulse amplitude selective circuit comprising a source of pulses of positive polarity, first and second screen grid tubes each having a cathode, a control grid, and an anode, a connection including a coupling condenser and a resistor in series therewith from said source to the control grid of said first tube, a resistor connected between the control grid and cathode electrodes of said first tube, said last resistors forming a voltage divider, a connection including a coupling condenser from said source to the control grid of said second tube, a resistor connected between the control grid and cathode electrodes of said second tube, a connection including a coupling condenser from the anode of said second tube to the control grid of said first tube, means for normally biasing both of said tubes to the anode current cut-off condition but with a greater bias on said second tube, and an output circuit coupled to the anode electrode of said first tube.

3. A pulse amplitude selective circuit comprising a source of pulses of positive polarity, first and second screen grid tubes each having a cathode, a control grid and an anode, a connection including the series circuit of a coupling condenser, a cathode follower and a resistor from said source to the control grid of said first tube, a resistor connected between the control grid and cathode electrodes of said first tube, said last resistors forming a voltage divider, a connection including a coupling condenser from said source to the control grid of said second tube, a resistor connected between the control grid and cathode electrodes of said second tube, a connection including a coupling condenser from the anode of said second tube to the control grid of said first tube, means for normally biasing both of said tubes to the anode current cut-off condition but with a greater bias on said second tube, and an output circuit coupled to the anode electrode of said first tube.

4. A pulse amplitude selective circuit comprising a source of pulses of positive polarity, first and second screen grid tubes each having a cathode, a control grid and an anode, a connection including a coupling condenser and a resistor in series therewith from said source to the control grid of said first tube, a resistor connected between the control grid and cathode electrodes of said first tube, said last resistors forming a voltage divider, a connection including a coupling condenser from said source to the control grid of said second tube, a resistor connected between the control grid and cathode electrodes of said second tube, a connection including a coupling condenser from the anode of said second tube to the control grid of said first tube, impedance elements in circuit with the cathode and screen grid electrodes of both tubes for enabling these tubes to operate with a sharp cut-off characteristic for small changes in amplitude of pulse applied to their respective grids, means for normally biasing both of said tubes to the anode current cut-off condition but with a greater bias on said second tube, the values of the resistors of said voltage divider and the gains of said tubes being so related to the biases on said tubes that the pulses which are passed by said second tube are of substantially the same magnitude as the pulses which are applied to the control grid of said first tube by said first connection, and an output circuit coupled to the anode electrode of said first tube.

5. A pulse amplitude selective circuit comprising a source of pulses of positive polarity, a first screen grid tube, a connection including a resistor from said source to the input electrode of said tube, an output circuit coupled to the output electrode of said first tube, a second screen grid tube, a connection from said source to the control grid of said second tube, a connection between the output electrode of said second tube and the input electrode of said first tube, and means for normally biasing both of said tubes to the anode current cut-off condition but with a greater bias on said second tube.

6. A pulse amplitude selective circuit comprising a source of pulses of positive polarity, a first screen grid tube, a connection including the series circuit of a grid-controlled vacuum tube, a coupling condenser and a resistor from said source to the input electrode of said tube, said source being coupled to the grid of said vacuum tube while said input electrode of said screen grid tube is coupled to another electrode of said vacuum tube, an output circuit coupled to the output electrode of said first tube, a second screen grid tube, a connection including another coupling condenser from said source to the control grid of said second tube, a connection including a third coupling condenser between the output electrode of said second tube and the input electrode of said first tube, and means for normally biasing the input electrodes of both of said tubes to the anode current cut-off condition but with a greater bias on said second tube.

7. A pulse amplitude selective circuit comprising first and second screen grid tubes, means for differently biasing said tubes so that they are both cut-off, a pair of connections for supplying unidirectional pulses of positive polarity to the control grids of both said tubes, one of said connections having a resistor therein forming part of a voltage divider, means in circuit with the screen grids of said tubes for enabling said tubes to operate with a sharp cut-off characteristic for small changes in amplitude of pulses applied to their respective control grids, means coupling the output electrode of said first tube and the control grid of said second tube to the same point on said voltage divider intermediate the ends of said divider, and means for deriving an output from said second tube.

8. A pulse amplitude selective circuit comprising a source of unidirectional pulses, first and second vacuum tubes each having a cathode, a control grid, and an anode, a connection including a coupling condenser and a resistor in series therewith from said source to the control grid of said first tube, a resistor connected between the control grid and cathode electrodes of said first tube, said last resistors forming a voltage divider, a connection including a coupling condenser from said source to the control grid of said second tube, a connection including a coupling condenser from the anode of said second tube to the control grid of said first tube, means for normally biasing both of said tubes to the anode current cut-off condition but with a greater bias on said second tube, and an output circuit coupled to the anode electrode of said first tube.

References Cited in the file of this patent

UNITED STATES PATENTS

| | | |
|---|---|---|
| 2,266,401 | Reeves | Dec. 16, 1941 |
| 2,272,070 | Reeves | Feb. 3, 1942 |
| 2,419,548 | Grieg | Apr. 29, 1947 |